June 2, 1959     J. C. HOSTETTER     2,888,779
GARDEN CURBING
Filed June 29, 1956     3 Sheets-Sheet 1
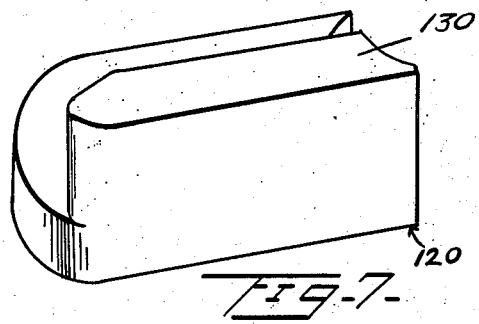
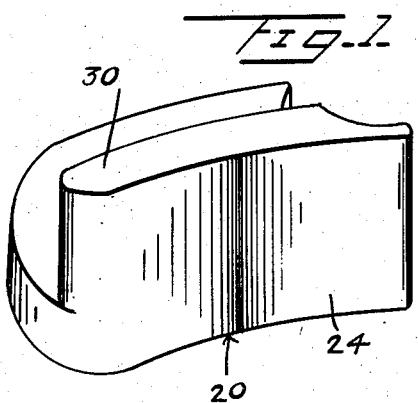
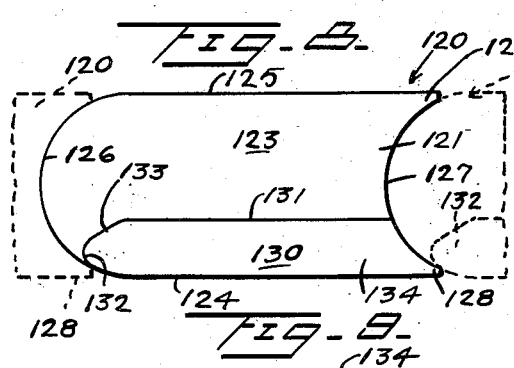
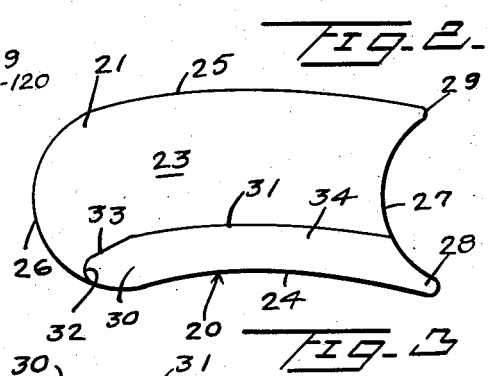
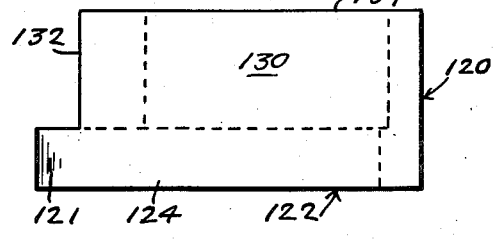
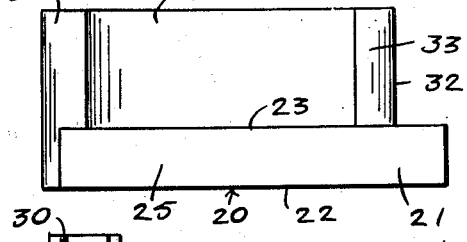
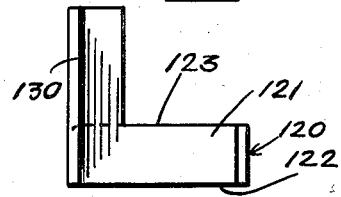
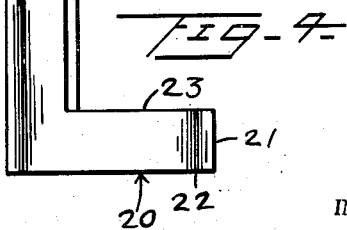
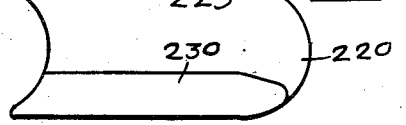
INVENTOR
J. C. Hostetter
BY Kimmel & Crowell
ATTORNEYS June 2, 1959  J. C. HOSTETTER  2,888,779
GARDEN CURBING
Filed June 29, 1956  3 Sheets-Sheet 2
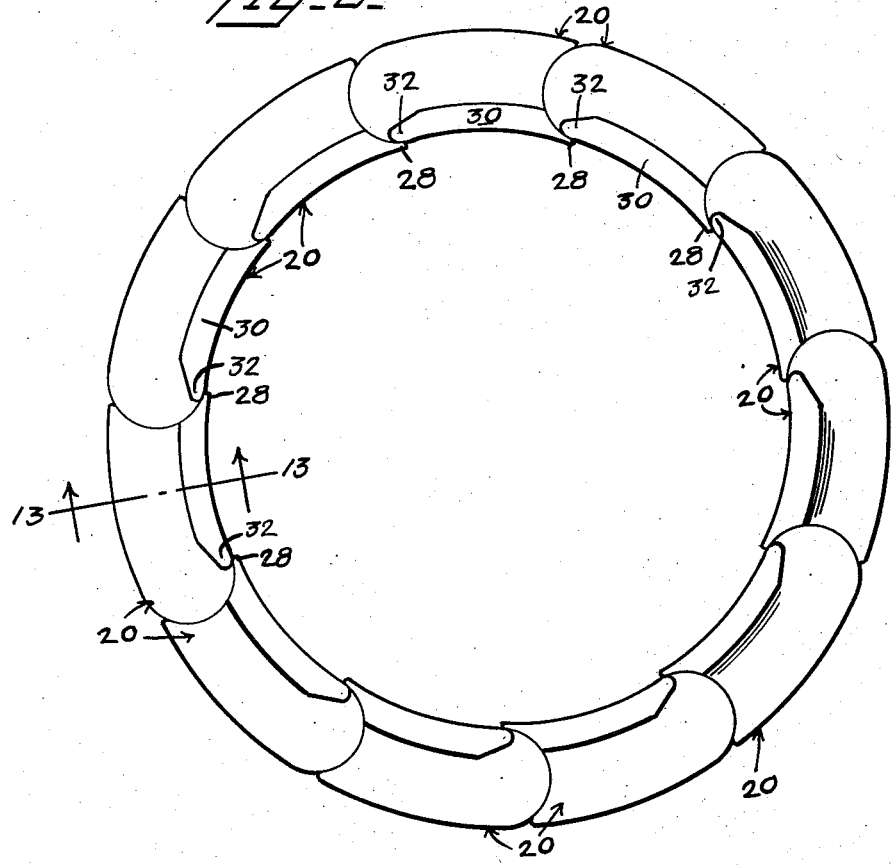
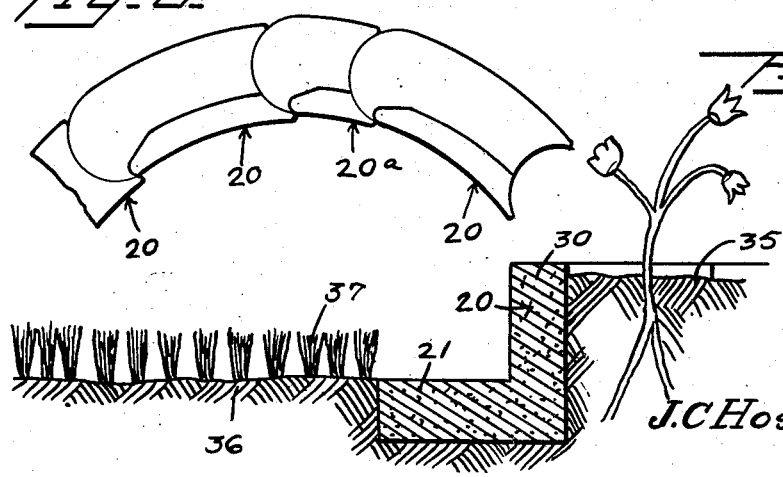
INVENTOR
J.C. Hostetter
BY
Kimmel & Crowell
ATTORNEYS

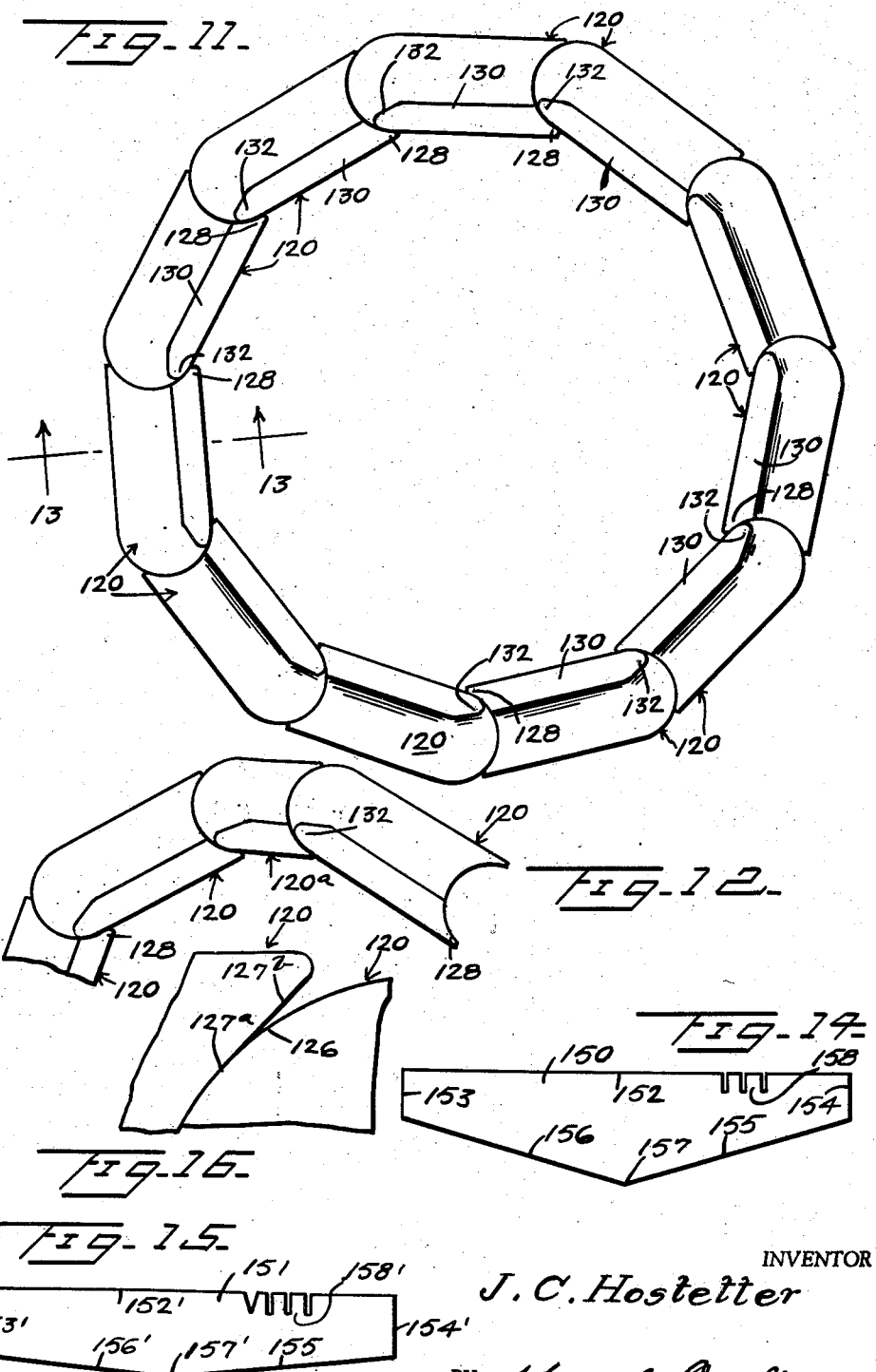

United States Patent Office 2,888,779
Patented June 2, 1959

2,888,779

GARDEN CURBING

John C. Hostetter, Winter Park, Fla.

Application June 29, 1956, Serial No. 594,777

6 Claims. (Cl. 47—33)

The present invention relates to garden curbings, and more particularly to curbing which is adapted to form a flower border and simultaneously provide a path for the wheels of a lawn-mower.

The primary object of the invention is to provide a flower garden curbing consisting of a plurality of blocks which can be abutted in end to end relation and angularly adjusted with relation to each other without interrupting the continuity of the flower border wall or the lawn-mower path.

Another object of the invention is to provide a flower border curbing with which border perimeters of a curving form either circular, elliptical, oval or combinations thereof, symmetrical or non-symmetrical may be formed while maintaining a continuous side wall.

A further object of the invention is to provide a garden curbing of the class described above which can be assembled without mortar or other binding materials by unskilled labor.

A still further object of the invention is to provide a flower garden curbing formed of either straight or curved segments to permit the formation of curved and straight portions of a flower garden border.

Another object of the invention is to provide a garden curbing which is inexpensive to manufacture, simple to use, and completely effective in its operation.

Other objects and advantages will become apparent in the following specification when considered in the light of the attached drawings, in which:

Figure 1 is a perspective view of a curbing block formed in accordance with the invention.

Figure 2 is a top plan view of the block illustrated in Figure 1.

Figure 3 is a front elevation of the block illustrated in Figure 1.

Figure 4 is an end elevation looking at one end of the block illustrated in Figure 1.

Figure 5 is a plan view of a plurality of blocks formed into a generally circular flower bed.

Figure 6 is a fragmentary view showing in plan a plurality of the blocks illustrated in Figure 1 formed into a generally circular flower bed and illustrating a modified short block construction.

Figure 7 is a perspective view of a modified form of the invention illustrating a straight block construction.

Figure 8 is a plan view of a straight block construction.

Figure 9 is a rear elevation of the block illustrated in Figure 8.

Figure 10 is an end elevation of the block illustrated in Figure 8 showing one end of the block.

Figure 11 is a plan view illustrating a plurality of the blocks shown in Figure 8 formed into a polygonal flower garden border.

Figure 12 is a plan view of a plurality of blocks illustrated in Figure 8 formed into a flower border and illustrating a modified form of short block used therewith.

Figure 13 is a vertical cross-section taken along the line 13—13 of Figure 11, looking in the direction of the arrows.

Figure 14 is a plan view of a gauge plate utilized in forming the configuration illustrated in Figure 11.

Figure 15 is a plan view of a modified form of gauge plate utilized for forming a somewhat larger flower bed than that illustrated in Figure 11.

Figure 16 is an enlarged fragmentary plan view of the formation of the joint between adjacent blocks.

Figure 17 is a plan view of another modified block construction.

Referring now to the drawings in detail wherein like reference characters indicate like parts throughout the several figures, the reference numeral 20 indicates generally a curbing block constructed in accordance with the invention.

The curbing block 20 has a horizontally extending base portion 21 having a lower side 22 and an upper side 23 arranged in spaced parallel relation to the lower side 22. The base portion 21 is provided with arcuate vertical side edges 24 and 25 which are arranged in generally parallel relation. The side edges 24 and 25 are joined at one end by a convex semi-cylindrical end wall 26, and at its opposite end by a concave semi-cylindrical end wall 27.

The arcuate side wall 24 is slightly offset with relation to the arcuate side wall 25 so that a nose 28 is formed between the concave cylindrical end wall 27 and the arcuate side wall 24. A similar nose 29 substantially shorter than the nose 28 is formed between the arcuate side wall 25 and the concave cylindrical end wall 27 on the opposite side of the base portion 21.

An integral upstanding curb portion 30 projects upwardly from the base portion 21 with the arcuate side wall 24 of the base 21 forming as an upward extension thereof one side wall for the curb portion 30. The curb portion 30 has a second side wall 31 arranged in parallel spaced relation to the side wall 24 and projecting perpendicularly upwardly from the top wall 23 of the base portion 21. One end of the curb portion 30 is provided with an upward extension of the concave cylindrical wall 27 to form an end wall thereon and is an upward extension of the nose 28. The opposite end of the curb portion 30 is provided with a convex nose 32 which is joined by a truncated wall 33 to the side wall 31 of the curb portion 30. The curb forming portion 30 is provided with a top edge 34 arranged in spaced parallel relation to the top wall 23 of the base portion 21.

The semi-cylindrical concave end wall 27 and the semi-cylindrical convex end wall 26 on opposite ends of the block 20 are formed as arcs of the same radius so that when the blocks 20 are positioned as illustrated in Figure 5, the convex end wall 26 of one block 20 will fit into the concave end wall 27 of the next adjacent blocks 20 to provide a continuous construction. As can be seen in Figure 5, the nose 28 on the blocks 20 are adapted to cooperate with the noses 32 on the next adjacent blocks 20 to provide a continuous upstanding curb formed from a plurality of the curb portions 30.

The blocks 20 can be angularly adjusted with relation to the next adjacent block 20 to form large or small flower borders as desired without interrupting the continuity of the curb portions 30 since the nose 28 and the nose 32 of the curb portion 30 are formed on the same arcs as the concave wall 27 and the convex wall 26 permitting angular adjustment of the blocks 20 without loss of contact between the noses 28 and 32.

The cross-section shown in Figure 13 illustrates how the curb portion 30 will hold the earth 35 in the flower bed while the base portion 21 is positioned on a level with the ground or sod line 36 to permit the wheels of a lawn-mower to ride thereon so as to trim the grass 37 completing the lawn cutting operation without the necessity of hand trimming.

In Figure 6 a block 20a is illustrated in conjunction with blocks 20. The block 20a is identical in every respect with the blocks 20 with the exception of the total length thereof. The blocks 20a are formed half as long as the blocks 20 so as to permit the simulation of borders requiring curvatures not possible with the blocks 20. This refers to the center line dimension of the horizontal section—not to the total over-all length of the block 20. The use of half-length blocks yields a smoother curve for small diameter beds.

Referring now to the modification illustrated in Figures 7 through 12, a curbing block 120 is indicated generally.

The curbing block 120 has a horizontally extending base portion 121 having a lower side 122 and an upper side 123 arranged in spaced parallel relation to the lower side 122. The base portion 121 is provided with flat vertical side edges 124 and 125 which are arranged in spaced parallel relation.

The side edges 124 and 125 are joined at one end by a convex semi-cylindrical end wall 126, and at its opposite end by a concave semi-cylindrical end wall 127. The relationship of the semi-cylindrical end wall 127 and the side edge 124 is such as to provide a nose 128 therebetween projecting outwardly from the block 120. A similar nose 129 is formed between the concave end wall 127 and the side edge 125 on the opposite side of the base portion 121.

An integral upstanding curb portion 130 projects upwardly from the base portion 121 with the flat side edge 124 of the base 121 forming, as an upward extension thereof, one side wall for the curb portion 130. The curb portion 130 has a second side wall 131 arranged in spaced parallel relation to the side edge 124 and projecting perpendicularly upwardly from the top wall 123 of the base portion 121. One end of the curb portion 130 is provided with an upward extension of the concave cylindrical wall 127 to form an end wall thereon including an upward extension of the nose 128. The opposite end of the curb portion 130 is provided with a convex nose 132 which is joined by a truncated wall 133 to the side wall 131 of the curb portion 130.

The curb forming portion 130 is provided with a top edge 134 arranged in spaced parallel relation to the top wall 123 of the base portion 121. The semi-cylindrical concave end wall 127 and the semi-cylindrical convex end wall 126 on opposite ends of the block 120 are formed as arcs of the same radius so that when the blocks 120 are positioned as illustrated in Figure 11 the noses 128 on the blocks 120 are adapted to cooperate with the noses 132 on the next adjacent blocks 120 to provide a continuous upstanding curb formed from a plurality of the curb portions 130.

The blocks 120 can be angularly adjusted with relation to the next adjacent blocks 120 to form large or small flower borders as desired without interrupting the continuity of the curb portions 130 since the nose 128 and the nose 132 of the curb portion 130 are formed on the same arcs as the concave wall 127 and the convex wall 126 permitting angular adjustment of the blocks 120 without loss of contact between the noses 128 and 132.

The cross-section shown in Figure 13 and described as being taken through the block 20 provides an accurate concept of the cross-sectional shape of the block 120.

In Figure 12 a block 120a is illustrated in use in conjunction with blocks 120. The blocks 120a are identical in every respect with the blocks 120 with the exception that they are made half as long as the blocks 120 and can be utilized to form flower borders of a configuration such as would be impossible to form with the longer blocks 120. This refers to the center-line dimension of the horizontal section—not the total over-all length of the block 120. The use of half-length blocks yields a smoother curve for small diameter beds.

In Figure 16 a slightly modified concave end 127a is illustrated in which the semi-cylindrical wall 127a is provided with outwardly flaring tangent end portions 127b to permit adjacent blocks 120 to be arranged at a smaller angle to each other than would otherwise be possible.

Figures 14 and 15 illustrate a pair of flat angular guide blocks 150 and 151. The guide block 150 has a longitudinal straight edge 152 terminating in perpendicularly extending end edges 153 and 154. The side of the block 150 opposite the edge 152 is provided with a pair of converging edges 155 and 156 meeting in an apex 157.

In forming roughly circular flower borders with the blocks 120, a guide plate 150 is provided for each size of circle it is desired to make. The guide block 150 is used for forming size III circles and is provided with indicia 158 to indicate the size. In forming a flower border utilizing the guide block 150, the side 124 of the blocks 120 are brought in contact with the sides 155 and 156 of the guide plate 150 to establish an angle therebetween. Successive blocks 120 are placed in position on the ground using the guide block 150 to form the complete flower border.

The guide block 151 is provided with edges 152', 153' and 154' all similar to the block 150, while a pair of converging sides 155' and 156' meet at an apex 157' to form the guiding side of the guide block 151. The angle between the converging edges 156' and 155' is somewhat greater than the angle between the converging edges 155 and 156 so that the blocks 120 when used herewith will form a size VIII circle with the indicia 158' so indicating.

The modification illustrated in Figure 17 comprises a block 220 virtually identical to the block 120 with the exception that the edge 225 opposite the upright portion 230 is formed in a convex curvature to cause a simulation of a curving border even when the curved blocks 20 are not used.

The formation of curbing for providing flower borders or beds has been relatively simple for exact dimension beds with straight edges and even true circles, however, it has been virtually impossible to provide flower border curbing blocks which would provide a continuous lawnmower edge as well as a continuous curb wall and be able to be adjusted angularly with respect to the adjacent blocks.

The present devices completely overcomes this trouble and makes it possible for the average householder to erect his own flower borders without the necessity of hiring skilled labor.

Having thus described the preferred embodiments of the invention, it should be understood that numerous other structural modifications and adaptations may be resorted to without departing from the scope of the appended claims.

What is claimed is:

1. A flower border formed of a plurality of blocks positioned in end-to-end contacting relation with each of said blocks comprising; a horizontal base portion having parallel upper and lower surfaces, spaced apart side walls, a concave semi-cylindrical end wall connecting the adjacent ends of said side walls, and a convex semi-cylindrical end wall connecting the opposite adjacent ends of said side walls, said concave end wall and said convex end wall having the radii thereof equal; an upstanding curb portion formed integrally with said base portion, said curb portion having a side wall formed as an upward extension of one side wall of said base portion, a second side wall on said curb portion spaced from said first side wall on said curb portion extending substantially perpendicularly to said upper surface; a concave end wall on said curb portion formed as an upward extension of the concave end wall on said base portion, a convex end wall on the end of said curb portion opposite the concave end wall thereon, said convex end wall having a portion thereof formed as an upward extension of an edge portion of said convex end wall on said base portion; whereby said blocks arranged with the convex end wall of the base portion of one block engaging in the concave end wall of the base portion of the next adjacent block can be angularly adjusted in a horizontal plane without interrupting the contact between said blocks and with the convex end wall of said curb portion remaining in contact with the concave end wall of the curb portion of the next adjacent block providing a continuous curb portion and a continuous horizontal portion along the flower border.

2. A device as claimed in claim 1 wherein the end of said second side wall of said curb portion adjacent the convex end thereof is truncated at an angle to said second named side wall of said curb portion.

3. A device as claimed in claim 1 wherein said side walls of said base portion and said side walls of said curb portion are all arranged in parallel relation.

4. A device as claimed in claim 1 wherein said side walls of said base portion and said side walls of said curb portion are all formed as arcs of concentric circles.

5. A device as claimed in claim 1 wherein the side wall of said base portion opposite said curb portion is outwardly bowed between said concave and said convex end walls.

6. A device as claimed in claim 1 wherein said concave end wall on said base portion is provided with a pair of opposed tangential extensions at the opposite ends thereof whereby the angle of available adjustment between said blocks is increased.

References Cited in the file of this patent

UNITED STATES PATENTS

| | | |
|---|---|---|
| 352,146 | Oungst | Nov. 9, 1886 |
| 1,916,494 | Schrickel | July 4, 1933 |

FOREIGN PATENTS

| | | |
|---|---|---|
| 334,814 | France | Nov. 4, 1903 |